Feb. 21, 1961    R. S. MacCAFFRAY, JR    2,972,244
METHOD FOR MAKING NONDIRECTIONAL WARP KNITTED PILE FABRIC
Filed Sept. 17, 1957    10 Sheets-Sheet 1
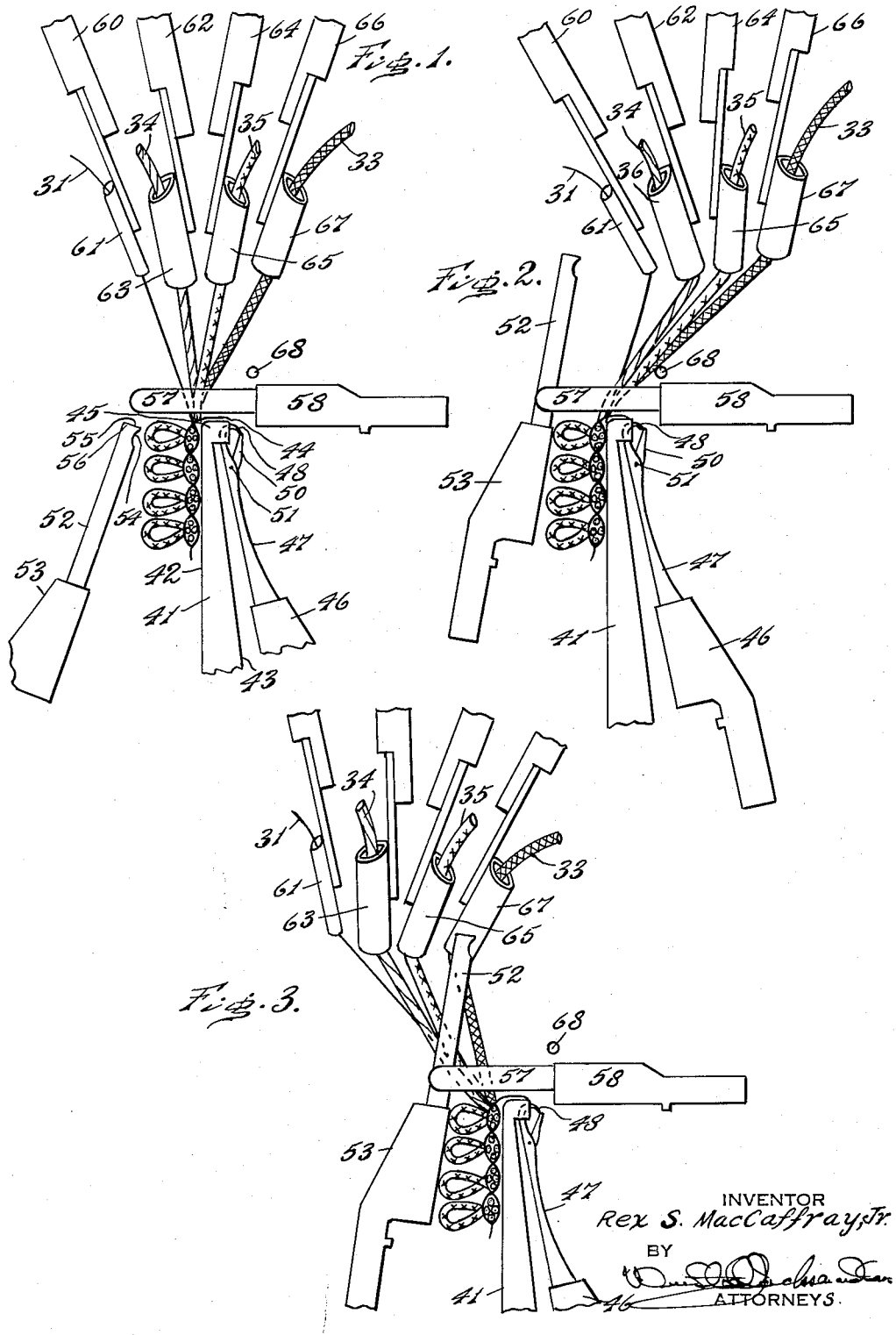
INVENTOR
Rex S. MacCaffray, Jr.
BY
ATTORNEYS.

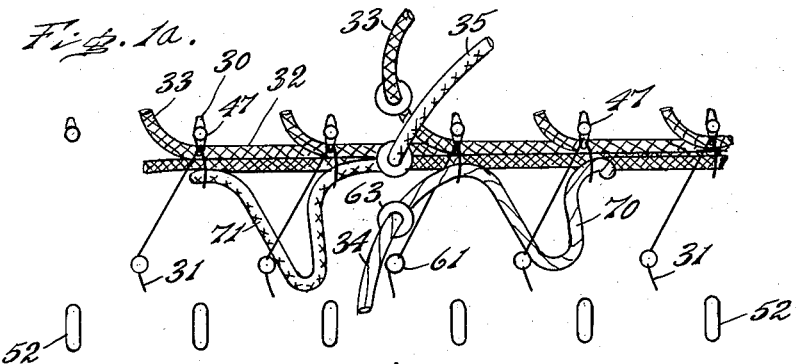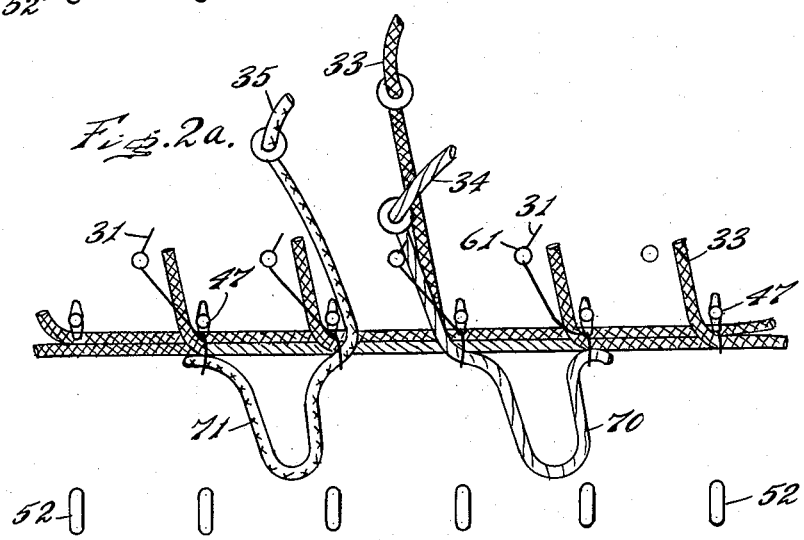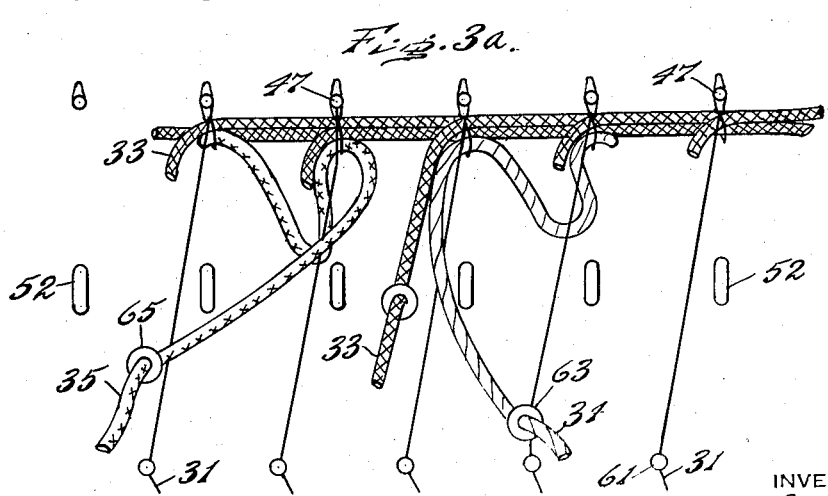

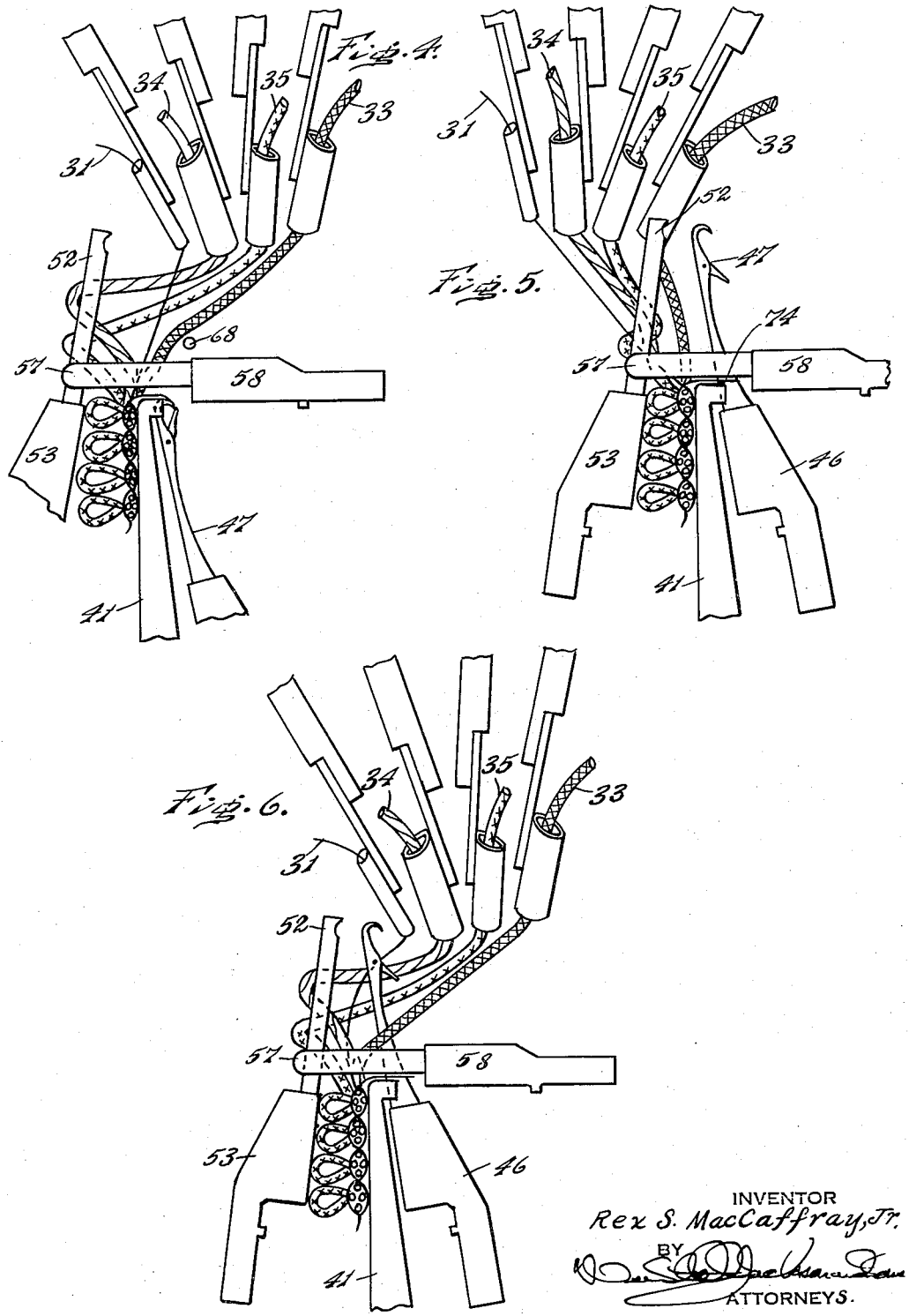

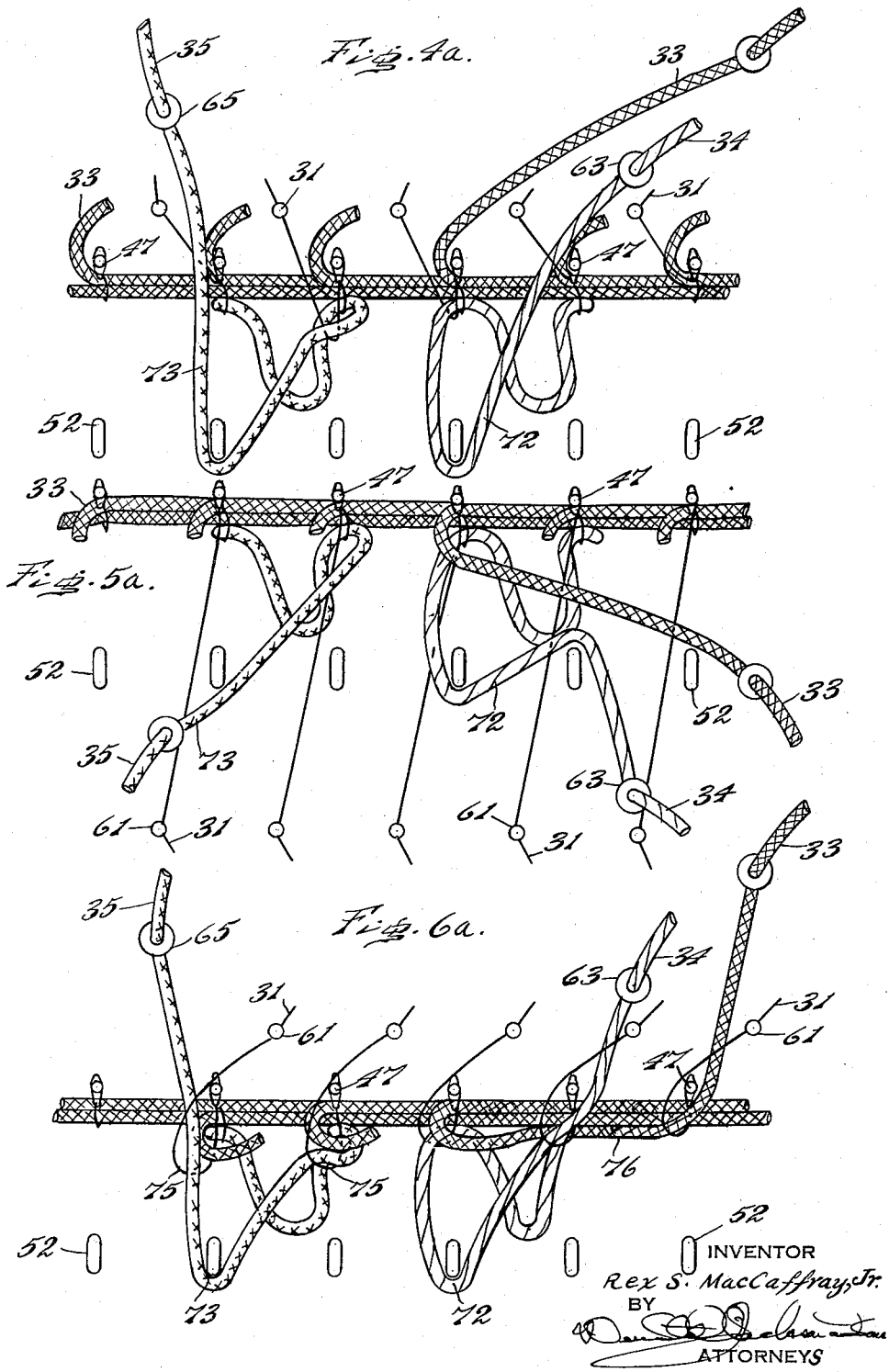

INVENTOR
Rex S. MacCaffray, Jr.
ATTORNEYS.

Feb. 21, 1961 R. S. MacCAFFRAY, JR 2,972,244
METHOD FOR MAKING NONDIRECTIONAL WARP KNITTED PILE FABRIC
Filed Sept. 17, 1957 10 Sheets-Sheet 6
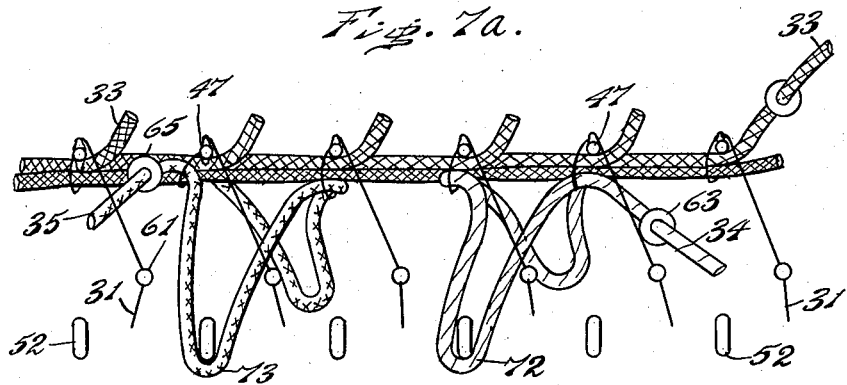
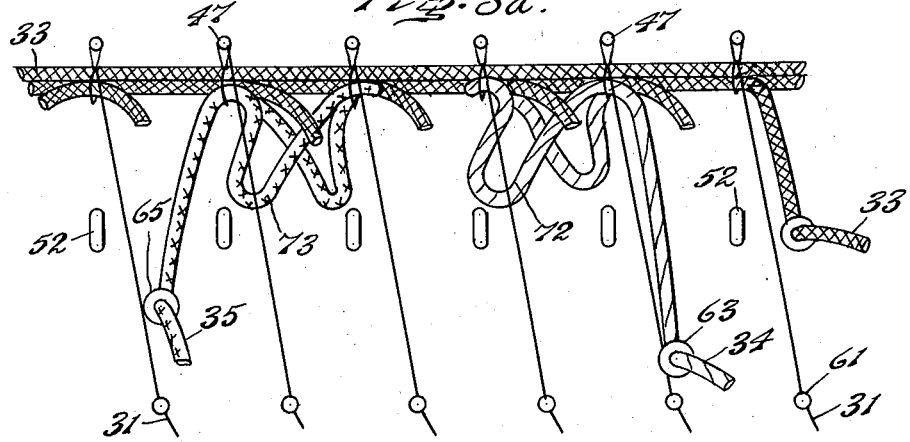
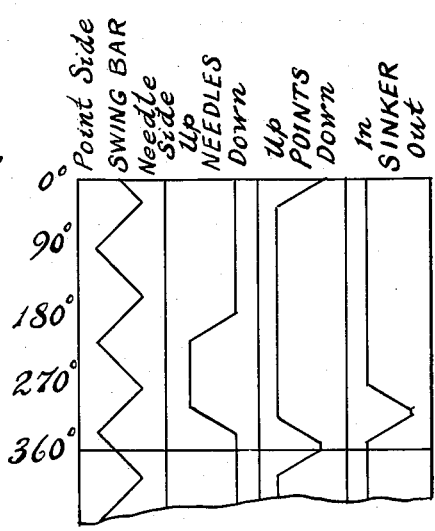
INVENTOR
Rex S. MacCaffray, Jr.
BY
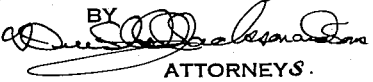
ATTORNEYS.

Feb. 21, 1961 R. S. MacCAFFRAY, JR 2,972,244
METHOD FOR MAKING NONDIRECTIONAL WARP KNITTED PILE FABRIC
Filed Sept. 17, 1957 10 Sheets-Sheet 7
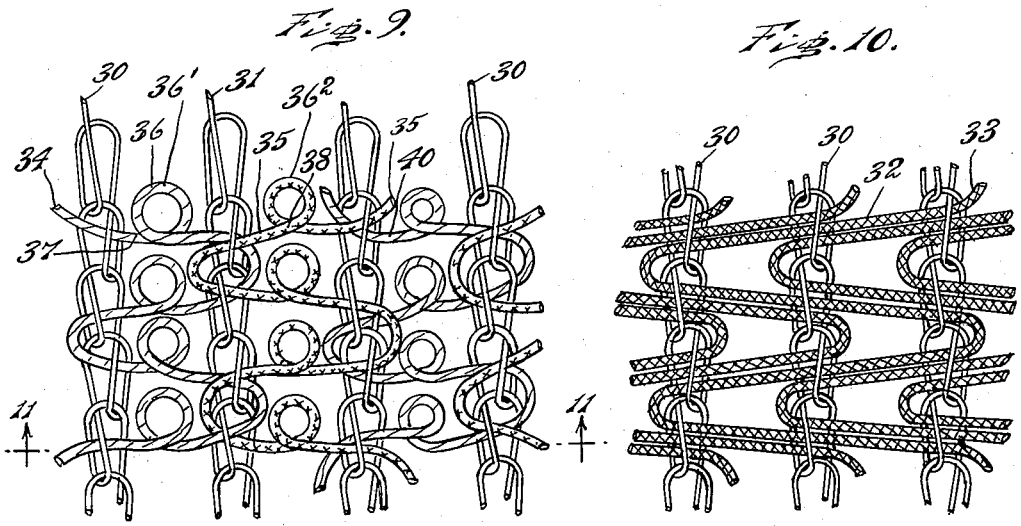
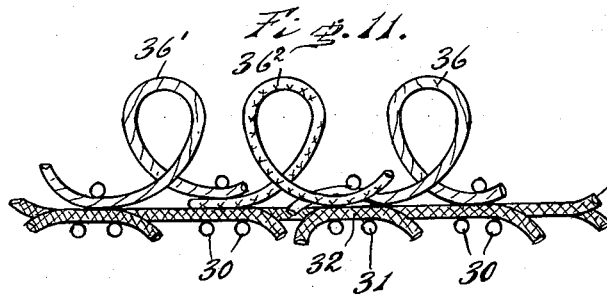
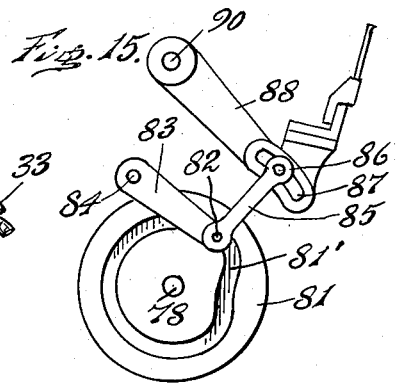
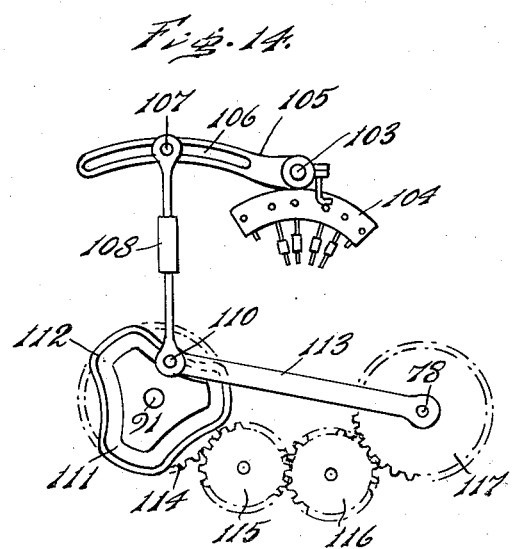
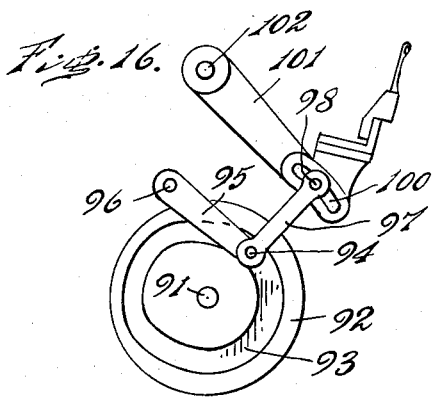
INVENTOR
Rex S. MacCaffray, Jr.
BY
ATTORNEYS Feb. 21, 1961  R. S. MacCAFFRAY, JR  2,972,244
METHOD FOR MAKING NONDIRECTIONAL WARP KNITTED PILE FABRIC
Filed Sept. 17, 1957  10 Sheets-Sheet 8
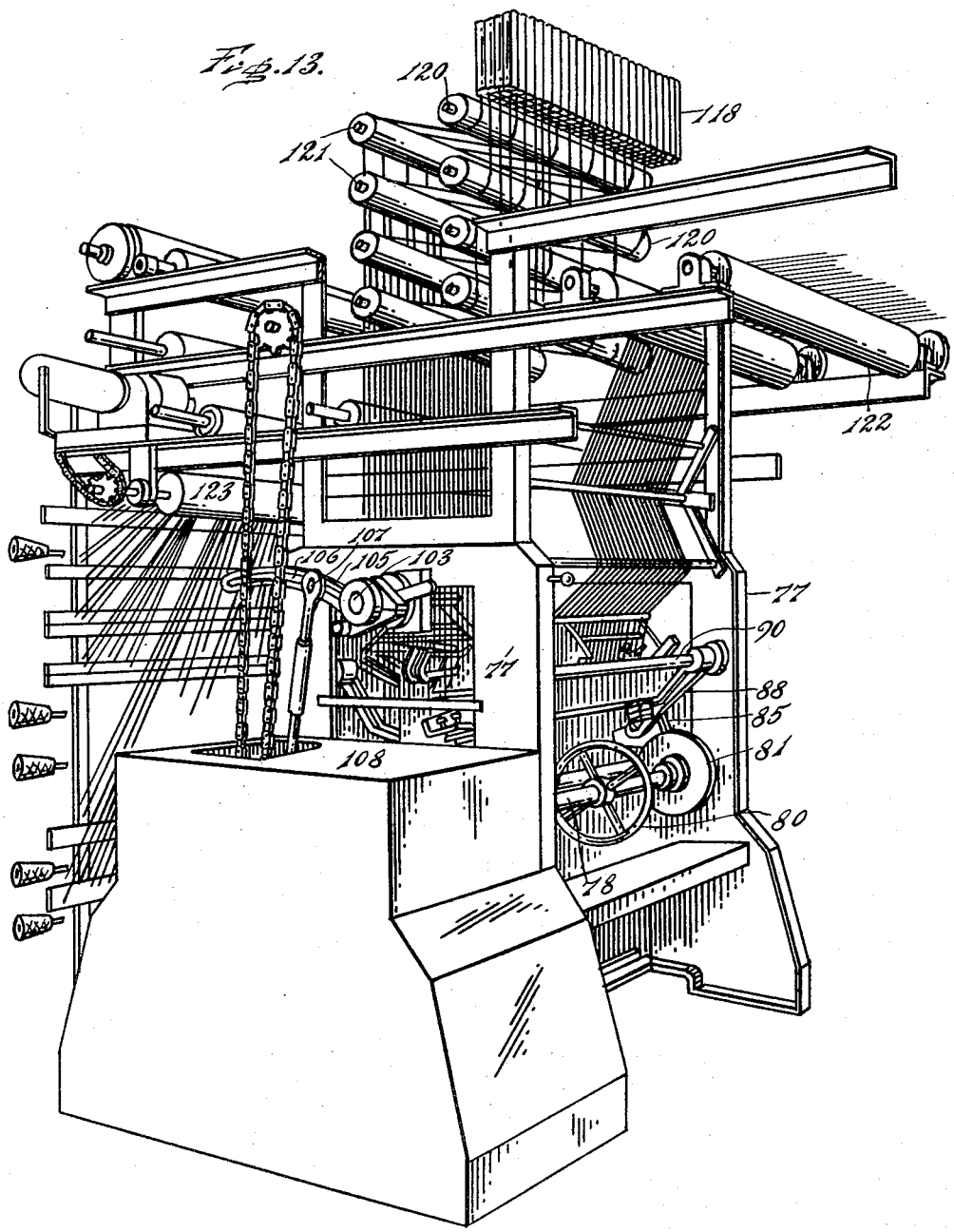
INVENTOR
Rex S. MacCaffray, Jr.
BY
ATTORNEYS.

Feb. 21, 1961 R. S. MacCAFFRAY, JR 2,972,244
METHOD FOR MAKING NONDIRECTIONAL WARP KNITTED PILE FABRIC
Filed Sept. 17, 1957 10 Sheets-Sheet 9

INVENTOR
Rex S. McCaffray, Jr.
BY
ATTORNEYS

United States Patent Office 2,972,244
Patented Feb. 21, 1961

2,972,244
METHOD FOR MAKING NONDIRECTIONAL WARP KNITTED PILE FABRIC

Rex S. MacCaffray, Jr., Boiling Springs, Pa., assignor to C. H. Masland & Sons, Carlisle, Pa., a corporation of Pennsylvania Filed Sept. 17, 1957, Ser. No. 684,587

7 Claims. (Cl. 66—85)

The present invention relates to methods of warp knitting pile fabric.

This application has been divided and the subject matter relating to the fabric has been embodied in my copending application Serial No. 783,733, filed December 30, 1958, for Nondirectional Warp Knitted Pile Fabric.

A purpose of the present invention is to reduce or eliminate directional characteristics and particularly lining effects in loop pile warp knitted pile fabrics.

A further purpose is to produce a warp knitted pile fabric which is less subject to distortion in knitting.

A further purpose is to reduce or eliminate the tendency of the pile in a warp knitted pile fabric to form or incline in a preferential direction, and avoid shadowing effects due to pile inclination.

A further purpose is to produce in the same course of a warp knitted pile carpet or rug, pile loops having one preferential orientation and other pile loops having a preferential orientation in a different and suitably transverse direction, such loops being referred to herewith as "right hand" and "left hand" loops.

A further purpose is to arrange the order of left hand and right hand loops coursewise of the fabric in a predetermined sequence by a suitable repeat, for example, alternating left hand and right hand loops of the same course in adjoining wales, or alternating right and left hand loops of the same course both occurring in the same wale. As another alternative, two, three or some succession of adjoining loops in the same course will be left hand, and two, three or some succession will be right hand, and so on across the course.

A further purpose of the invention is to shog one pile yarn guide bar always opposite to a second pile yarn guide bar, so that whenever one guide bar wraps the pile yarn around the plush points to the left, the other pile yarn guide bar wraps the yarn around the plush point to the right. The pile yarn guide bars always shog oppositely to one another.

A further purpose is to bind one leg of pile loops of two different guide bars in the same wale and to extend the loops oppositely and bind the opposite legs of the loops in different wales, preferably equally distant from the first wale. On the next course, this procedure is reversed.

Further purposes appear in the specification and in the claims.

In the drawings, I have chosen to illustrates a few only of the numerous embodiments in which my invention may appear, selecting the forms shown from the standpoints of convenience in illustration, satisfactory operation and clear demonstration of the principles involved.

Figures 1 to 8 inclusive are digrammatic fragmentary sections transverse to the length of the needle bar, the plush point bar and the sinker comb, showing progressive positions in the knitting operation.

Figure 1 corresponds to zero or 360°; Figure 2 corresponds to 30°; Figure 3 corresponds to 90°; Figure 4 corresponds to 150°; Figure 5 corresponds to 210°; Figure 6 corresponds to 270°; Figure 7 corresponds to 300°; and Figure 8 corresponds to 330° in the cycle.

Figures 1a to 8a are enlarged diagrammatic fragmentary plan views showing the knitting operation, and generally illustrating only two pile yarn ends of each of different frames (that is, pile warp sets). Figures 1a to 8a respectively correspond to the positions of Figures 1 to 8.

Figure 9 is a plan view of the fabric produced according to Figures 1 to 8 and 1a to 8a, illustrating only the chain knitting yarn and the pile yarn.

Figure 10 is a view similar to Figure 9, omitting the pile yarn and illustrating only the knitting chain and the backing yarn. It will be evident that the complete fabric will constitute the yarn of Figure 9 superimposed on the yarn of Figure 10, the chains of course being the same in both views.

Figure 11 is an enlarged coursewise section of Figure 9 on the line 11—11.

Figure 12 is a plan diagram showing the motion of the swing bar, needles, plush points and sinker throughout the cycle.

Figure 13 is a perspective of a warp knitting machine embodying the invention.

Figure 14 is a fragmentary diagrammatic elevation of the swing bar cam and associated mechanism in the knitting machine of Figure 13.

Figure 15 is a diagrammatic elevation of the plush point cam and associated mechanism in the knitting machine of Figure 13.

Figure 16 is a diagrammatic elevation of the needle bar cam and associated mechanism in the knitting machine of Figure 13.

Figure 7:
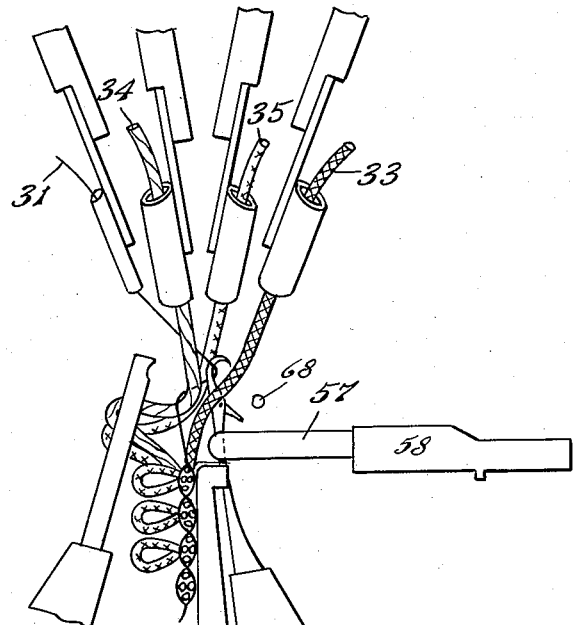

In the prior art, extensive use has been made of warp knitted pile fabrics in the house furnishing industry, especially for carpets and rugs.

The prior art fabrics of the uncut or looped pile variety have generally been subject to the disadvantage that the pile loops have a preferential orientation which is uniform in each course. This is disadvantageous from the standpoint of esthetic appeal and styling because it focuses attention on the linear arrangement of the loops, and of course exaggerates any slight deviation due to error in knitting. It also creates a preferential light response which is different in different directions causing shadowing.

The invariable orientation of the loops of each course in the prior art fabrics also increases the directional characteristics of the construction, so that the fabric produced is in general rather subject to distortion in knitting, usually by lateral contraction.

The present invention has overcome these difficulties by creating a fabric which has a nondirectional pile surface, and is relatively free of the other difficulties mentioned.

Lining effects and shadowing are not noticeable in the fabric of the invention, defects of weaving are less subject to observation and distortion in knitting is greatly reduced.

In accordance with the present invention, I provide in the same course some pile loops which are preferentially oriented in one direction and some which are preferentially oriented transversely thereto, that is, some left-hand and some right-hand. Depending upon the requirements of the particular fabric, the relation of the left-hand and right-hand loops may be one of providing each alternate loop coursewise which is transverse to the adjoining loop, or there may be a succession of loops with the same orientation coursewise, and then a succession with the opposite orientation, such as two or three loops coursewise which are right-hand and then two or three loops coursewise which are left-hand and so on.

A special feature of the invention relates to control of shogging on two or more face yarn guide bars so that the face yarn guide bars always shog oppositely.

Thus in one particular course having loops of the two frames of face yarn, one end of each loop will start in the same wale and the opposite end will be bound in adjoining wales, the span of the loops desirably being equal. On the next course the procedure will be opposite; these yarns starting loops in spaced wales, are bound in the opposite ends of the loop in the same wale.

The nature of the invention will be best understood by reference to Figures 9, 10 and 11.

As there shown the fabric comprises a series of chains 30 of knitting yarn 31 which lock together bundles 32 of transversely extending backing yarn 33, the backing yarn following any desirable serpentine course, in this case shogging back and forth across three wales. It will be understood that any suitable backing construction may be employed as desired.

The face of the fabric is formed from face yarn 34 of one guide bar and face yarn 35 of another guide bar, and in this case having ends threaded in tubes corresponding to alternate tricks. Each pile loop 36 is anchored at one side in one chain and at another side in the next chain, and extending coursewise across the fabric the loops are alternately right-hand loops 36' formed from one guide bar and left-hand loops 36² formed from the next guide bar.

The locus or path of travel of each pile yarn end is serpentine, the yarn traveling across from one chain to the next in one course, and then back in the opposite direction in the next course, so that in each course the pile yarn ends of the different frames forming adjoining loops in adjoining wales are always moving oppositely to one another. Thus in Figure 9 the loop forming stretch 37 in a particular course is moving to the left in one wale and the loop forming stretch 38 in the next wale and same course is moving to the right, while in the next wale the loop forming stretch 40 in the same course is moving to the left. In the next course the same yarn ends are moving in opposite directions.

Accordingly it will be evident that whereas a right-hand loop has one preferential orientation, a left-hand loop which adjoins it in the course has another preferential orientation, and the integrated result is to break up lining effects which otherwise would be created if all the loops in a particular course were oriented in the same way. This not only creates a more pleasing appearance, but it produces a fabric which is less subject to observing defects in knitting, and makes the fabric more resistant against deformation in knitting.

The knitting operation will be best understood by reference to Figures 1 to 8 and 1a to 8a.

A stationary vertically extending trick plate 41, as well known in the art of knitting machines of this character, is of generally tapered cross section, with a side 42 extending generally vertical and supporting the guide being formed and removed by the take-off, and a side 43 suitably slightly converging and adjoining the needles.

A trick plate at the top has a suitably notched needle guide top portion 44 and an end 45 shown in Figure 1 beneath the level of the sinkers.

The warp knitting machine employed is suitably of the double needle bar type, one needle bar mounting supports 46 for a series of latch needles 47, as well known, which extend vertically and are guided by the trick plate. The latch needles as shown in Figure 1 have hook ends 48 at the top directed away from the trick plate and latches 50 pivoted at 51 and in one position closing against hook ends. The other needle bar in the device of the invention at the opposite side of the trick plate is equipped with plush points instead of needles.

Noncutting plush points 52 are provided with mountings 53. The plush points have notches 54 on the upper ends at the side adjoining the fabric, flat top portions 55, and slight fillets 56 on the sides remote from the needles at the top. Otherwise the plush points will suitably be thin metallic strips.

Positioned immediately above the trick plate and adapted to move across it is a sinker comb 57 mounted on sinker supports 58 on a sinker bar as well known.

Suitably positioned above the sinkers, and extending entirely across the machine, is a swing bar which carries suitably positioned thereon in order from front to back, a horizontally slideable mounting 60 for a knitting yarn guide bar having eyes or tubes 61 which receive knitting yarn 31, next, a horizontally slideable mounting 62 carrying eyes or tubes 63 which guide face yarn ends 34 of frame or pile warp set A, then a horizontally slideable support 64 which mounts eyes or tubes 65 which guides face yarn ends 35 of frame or pile warp set B, and lastly a horizontally slideable support 66 which carries eyes or tubes 67 which guide backing yarn ends 33. A latch wire 68 extends across the back of the machine.

Considering first Figures 1 and 1a, which correspond to zero or 360 degrees, the first step is being taken for the completion of the next stitch, the needles 47 and the plush points 52 are down or retracted, the sinker comb 57 is advanced or forward, and the swing bar with the guide bars is in middle position and moving back. Where desired in fabric design, the guide bars for the face yarn shog at this point to establish the initial position for the new cycle, if required, and the backing yarn, if desired, shogs to create backing weft. Actually it is unimportant to the present invention whether or not shogging is accomplished at this position.

Figure 1a shows a plan which differs from that of Figures 9 to 11 in that there is an end of pile of one guide bar in each of two adjoining tricks, while ends of pile of another guide bar are out in these tricks, and then an end of pile of the other guide bar in the next two adjoining tricks, while ends of pile of the one guide bar are out in such next adjoining tricks. For convenience in illustration, only one of the bars of identical pile yarn ends in adjoining tricks is illustrated, the next one being omitted, but it will be understood that wherever in Figures 1a to 8a a particular pile yarn end is shown in one trick with a vacancy in the next trick, it is intended that there will be a repetition of such pile yarn end in the next trick.

It will be evident that in Figure 1a a series of knitted chains 30 of knitting yarn 31 lock together bundles 32 of backing yarn 33, and also bind against the backing on opposite sides of right-hand pile loop 70 formed by pile yarn end 34 from the one guide bar and left-hand pile loop 71 formed of pile yarn end 35 of pile yarn of the other guide bar. Thus respective right-hand and left-hand loops are in groups of wales or tricks, there being two adjoining wales or tricks having right-hand loops and two adjoining wales or tricks having left-hand loops.

Figure 2 corresponds to 30° of advance in the cycle. The position of the needles and the sinker comb in the same as in Figure 1. The guide bars are all the way back out of the way of the plush points, the plush points 52 having just completed their forward or upward motion.

Figure 2a shows the shifted position of the guide bars, and again illustrates the completed loops.

Figure 3 corresponds to the position of 90° in the cycle. The swing bar and the guide bars with it have moved to the front past the raised plush points and at th position the pile yarn guide bars now shog oppositely in accordance with the present invention. Thus as shown, pile yarn end 34 is shogged to the right and pile yarn end 35 is shogged to the left, so that it tends to wrap the yarn around its corresponding plush point in the opposite direction (Figure 3a).

At 150° in the cycle, as shown in Figures 4 and 4a, the swing bar is moved back, carrying with it the guide bars, while the positions of all the other elements remain the same.

The pile yarn ends are wrapped around the various plush points in opposite directions corresponding to their shog, but the yarn which would be wrapped around the plush point nearest to the observer in Figure 4 is not shown since it has been sectioned away.

Figure 4a illustrates the condition established in which a new left-hand loop 72 is formed from pile yarn end 34 and a new right-hand loop 73 is formed from pile yarn end 35.

Also at the position of Figures 4 and 4a the backing yarn 33 is shogged to the right to establish the next lay-in.

The position of Figures 5 and 5a at 210° in the cycle corresponds to the completion of all shogging except for the knitting yarn. The face yarn and knitting yarn guide bars have moved forward past the plush points, as shown in Figure 5a, and the face yarn ends 34 and 35 retain the formation of loops 72 and 73 around the plush points. The backing yarn guide bar is forward of the needle positions. The needles 47 have advanced or raised and the latches have been opened by the previous knitting stitch as shown at 74, while the previous knitting stitch has moved down below the latch, leaving the latch of the needle open as shown.

The position of Figures 6 and 6a corresponds to 270° in the cycle. This position shows all guide bars moving back of the plush points and the needles, with the new stitch ready to be formed when the knitting yarn enters the hook of the needles in the next step. This is suggested by the loops 75 of knitting yarn around the bundles of backing yarn and around the sides of the pile loops in Figure 6a. The pile yarn loops 72 and 73 are now completely formed but not completely anchored and the laid-in stretch of backing yarn at 76 has to be anchored by the stitches. Corresponding laid-in stretches not shown occur all the way across the course.

Figure 7 at 300° in the cycle shows the guide bars moving to the front and midway in their swing. The sinker comb 57, which was in position across the knitting point, and across the end of the trick plate among the needles, is now retracting to clear the ends of the needles, and the needles are beginning to retract, the latches on the needles soon to be closed by the previous stitch. The plush points are also retracting. As the needles retract the previous stitch is cast off. Actually the casting off takes place between the position of Figure 7 and the position of Figure 8, and once a stitch is cast off, the previous pile loops are fully bound and the backing is bound.

Figure 8:
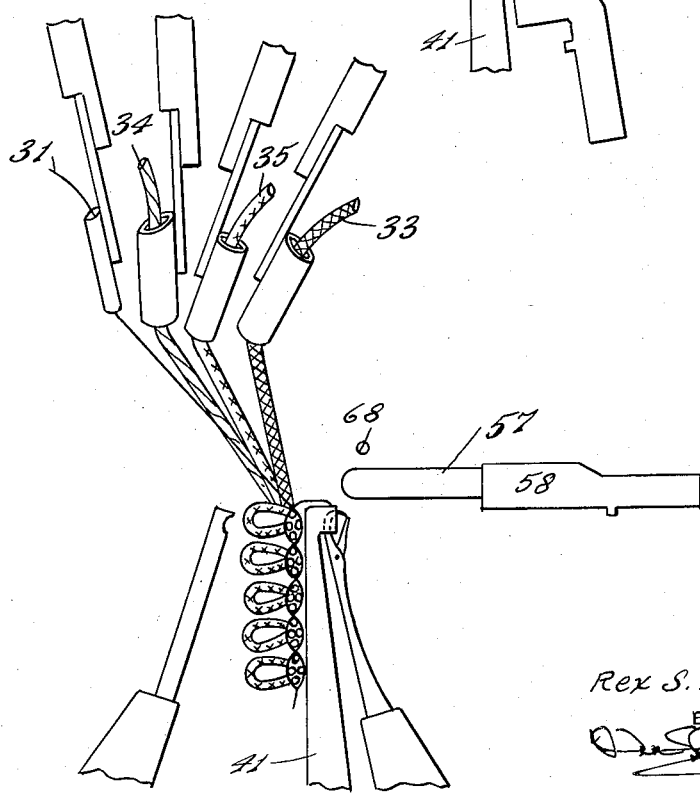

Figure 8, corresponding to 330°, shows the stitch fully completed and locked. The sinker comb is fully retracted and now about to advance again to the position of zero or 360° in Figure 1.

In some cases the sinker comb may not be advanced until later in the cycle as it is not required until the needles are ready to advance.

The relations of the cams throughout the cycle to produce the weave of Figures 1 to 8 and 1a to 8a or Figures 9 to 11 is shown in Figure 12 where the ordinate is angle and the abscissa is cam deflection. In the left-hand column, swing bar motion between the plush point side and the needle side is shown, while the next column shows needle motion up or down, the next column shows plush point motion up or down and the last column shows sinker comb motion in or out.

The warp knitting machine of the invention may be as described in D. F. Paling, Warp Knitting Technology (1952), chapter 11, Raschel Warp Looms, and chapter 12, Raschel Warp Loom Mechanism.

As well known in the art, the machine of Figure 13 has a frame 77 which journals a suitably driven horizontal front drive shaft 78 having a hand wheel 80, carrying plush point drive cam 81, best seen in Figure 15. The cam 81 has a cam track 81' receiving a cam follower 82 which pivotally connects to the free end of a lever 83 having a fixed pivot on the frame at 84. The pivotal connection to the follower 82 also pivotally connects to one end of a link 85, while at the other end it has a pin 86 which adjustably pivotally connects in an arcuate slot 87 on plush point arm 88 which is keyed on plush point bar shaft 90 journaled in the frame.

The plush point cam 81 conforms to the cam layout set forth in Figure 12.

The needle operating mechanism is identical in principle to the plush point operating mechanism, and is at the back of the machine of Figure 13. This mechanism appears in detail in Figure 16. A rear drive shaft 91 journaled in the frame mounts a needle bar cam 92 having a cam track 93 which receives a cam follower 94 pivotally connected to one end of lever 95, having fixed pivotal mounting on the frame at 96 on the other end. The follower 94 also pivotally connects to one end of a link 97 which at the other end has a pin 98 adjustably pivotally connecting in an arcuate slot 100 in the outer end of needle arm 101 which is keyed on needle arm shaft 102 extending across and journaled in the frame. The layout of cam 92 is shown in Figure 12.

Above the plush points and needles, horizontal swing bar shaft 103 extends across the machine journaled in the frame and carries swing bar brackets 104 carrying the guide bars above referred to, as well known in the art. The guide bars are shogged by the pattern control mechanism of the character shown in Paling above, beginning at page 145.

The swing bar has, secured thereto at one end, swing bar arm 105 (Figure 14) which has an arcuate adjustment slot 106 which receives an adjustment stud 107, which pivotally connects to one end of an adjustable link 108, which at the other end has a follower 110 which engages in cam track 111 of swing bar cam 112 operated on the back shaft 91. The follower is positioned by link 113 which pivotally engages follower 110 at one end and at the other end loosely surrounds front shaft 78.

The front shaft is suitably driven from the rear shaft by gear 114 on the rear shaft which connects through pinions 115 and 116 with gear 117 on the front shaft. The layout of the swing bar cam is shown in Figure 12.

Sinker comb mechanism will be that of the prior art, with a sinker cam layout used as in Figure 12.

Face yarn for each of the face yarn guide bars is taken from a creel through tubes 118 and then each end passes under a feed roll 120 and over a feed roll 121, and thence to the eyes or tubes of the appropriate guide bars. It will be evident that the feed of the feed rolls will be uniform or subject to pattern control as desired.

Depending upon the desired relation of ends of one face yarn guide bar and ends of the other face yarn guide bar to tricks, the thread-in will be appropriately arranged, in some cases using an end-in of both guide bars in each trick, and in other cases using an end-out of one guide bar where there is an end-in of the other guide bar and vice versa, with the ends of the particular frames or pile warp sets alternating or arranged in groups of subsequent tricks across the fabric.

Figure 17:
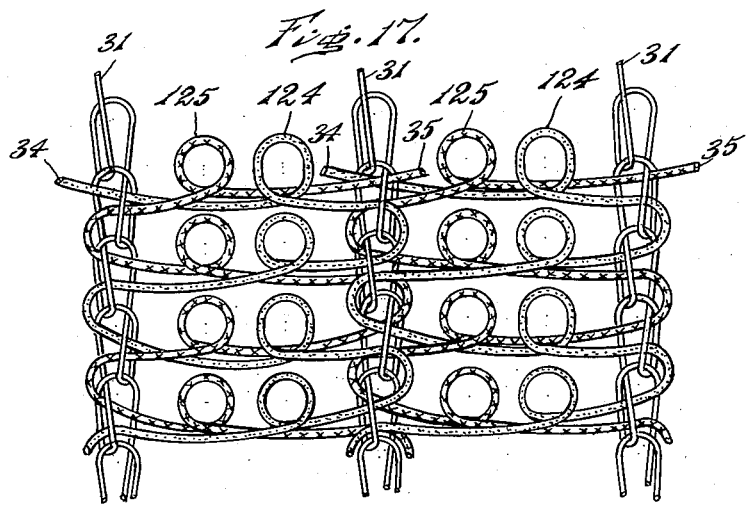
Figure 17 is a plan view corresponding to Figure 9, illustrating a variation which creates a right-hand and left-hand loop in the same wale and course.

The knitting yarn is fed by feed mechanism 122. The backing yarn is fed by feed mechanism 123.

Where there is to be an end-in of each of two guide bars in each trick, the resulting fabric is that shown in Figure 17, which has in each course in each wale for example a left-hand loop 124 made from one pile yarn guide bar and a right-hand loop 125 made from the other pile yarn guide bar. The end which forms the left-hand loop in one wale forms a right-hand loop in the next wale and course and vice versa so that the face of the resulting fabric is completely nondirectional.

Figure 18:
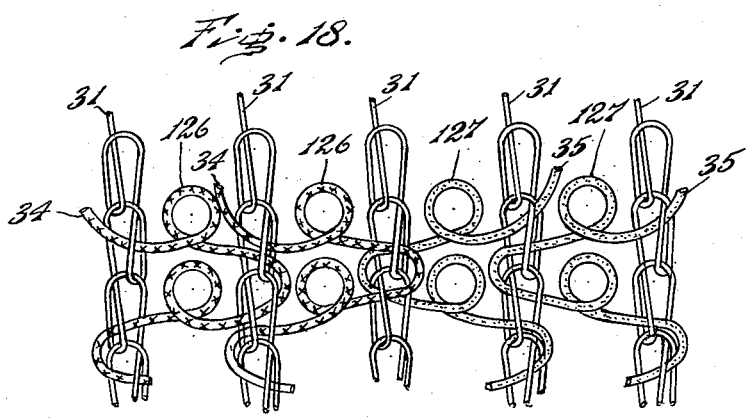
Figure 18 is a view similar to Figure 9 showing a sequence in which a plurality of right-hand loops extends coursewise and then a plurality of left-hand loops are in the same course.

The use of sequences of loops in the same direction in adjoining wales, as already explained in connection with Figures 1a to 8a, is illustrated more in detail in Figure 18, where in the same course extending coursewise there are, for example, two adjoining loops 126 turning in the same direction and then two adjoining loops 127 turning in the opposite direction.

It will be evident that by the principles of the present invention it is possible to obtain any desired predetermined relationship between right-hand loops and left-hand loops in the same course, greatly improving the overall effect and eliminating directional properties.

It will be evident, of course, that whereas only one cam of each type has been referred to herein, depending upon the width of the machine, there will normally be cams at opposite ends, or sequences of cams for every bay across the machine. As this merely duplicates the cams which have been shown, no effort has been made to illustrate the multiplicity of cams.

Figure 19:
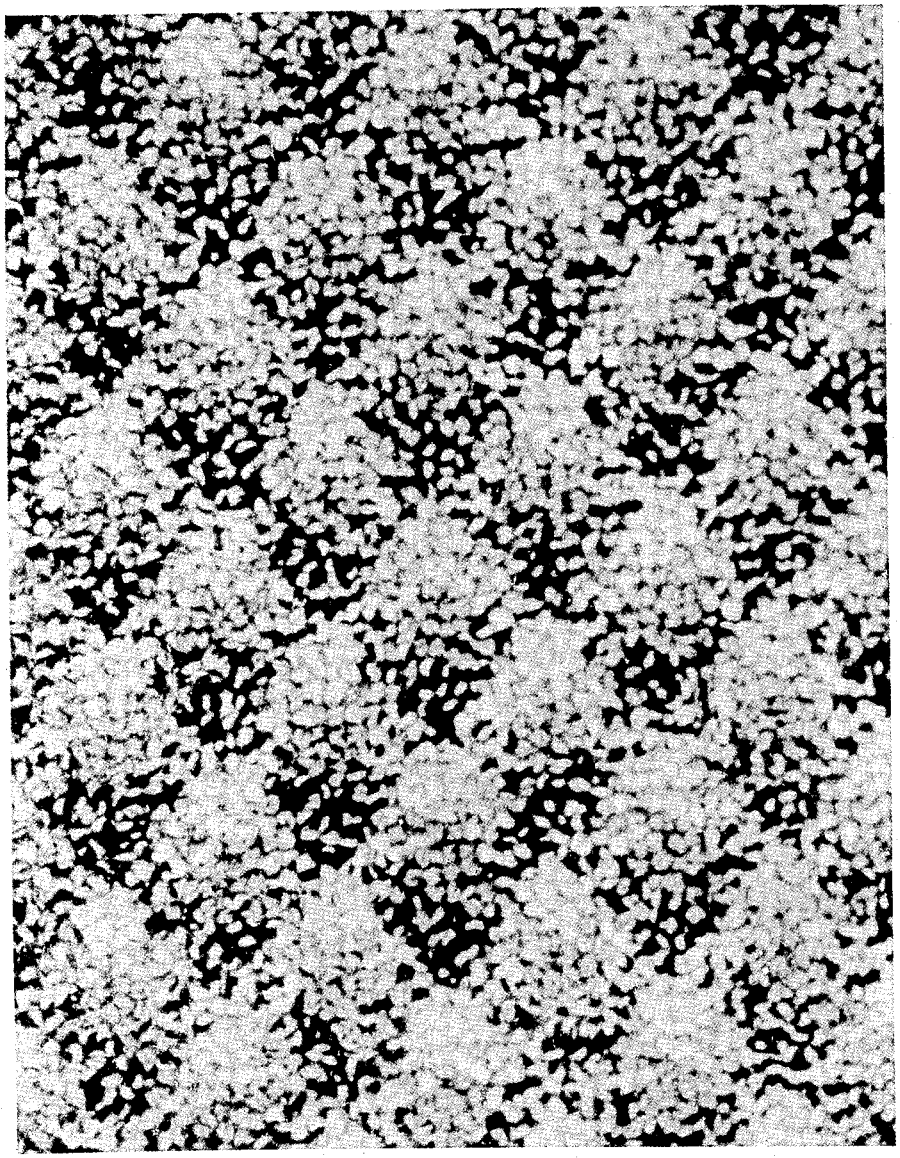
Figure 19 is a face view of a pile fabric according to the invention showing left-hand and right-hand loops formed in alternate wales of the same course.

Figure 19 illustrates the nondirectional character of the loops formed in accordance with the present invention, in which each successive loop in the same course is alternately left-hand and right-hand.

In view of my invention and disclosure variations and modifications to meet individual whim or particular need will doubtless become evident to others skilled in the art, to obtain all or part of the benefits of my invention without copying the method shown, and I, therefore, claim all such insofar as they fall within the reasonable spirit and scope of my claims.

Having thus described my invention, what I claim as new and desire to secure by Letters Patent is:

1. The method of warp knitting, which comprises forming pile loops around pile forming elements by shogging two pile yarn guide bars opposite to each other and wrapping the pile yarn oppositely around said pile forming elements in forming said pile loops, laying-in backing yarn, securing the laid-in yarn by knitting stitches to form a backing, and binding the pile loops by binding the pile yarn to the backing by said stitches.

2. The method of claim 1, in which the guide bars in shogging oppositely shog equal distances in each course.

3. The method of claim 2, in which particular pile yarn ends on the different guide bars are initially in the same tricks, shog oppositely in a particular course, and in the next course again shog oppositely to their motion in the first course, and return the particular pile yarn ends to the same tricks.

4. The method of claim 1, in which the pile loops are oriented at different angles to one another.

5. The method of claim 1, in which the pile loops are oriented at different angles to one another in the same course and in the same wale.

6. The method of claim 1, in which the pile loops are oriented at different angles to one another in the same course and in adjoining wales.

7. The method of warp knitting a pile fabric, which comprises shogging pile yarn ends oppositely and wrapping said yarn ends oppositely around pile forming elements to form loops in the opposite directions, laying in backing yarn, knitting stitches which unite the laid-in backing yarn to form a backing, and binding the ends of the loops in the backing to form loops in the same course which have preferential orientation different from one another.

References Cited in the file of this patent

UNITED STATES PATENTS

| | | |
|---|---|---|
| 422,646 | Smith | Mar. 4, 1890 |
| 1,924,649 | Morton | Aug. 29, 1933 |
| 2,005,951 | Morton | June 25, 1935 |
| 2,012,355 | Schonfeld | Aug. 27, 1935 |
| 2,200,280 | Klumpp et al. | May 14, 1940 |
| 2,476,153 | Little et al. | July 12, 1949 |
| 2,531,718 | Rice | Nov. 28, 1950 |
| 2,557,482 | Stolle et al. | June 19, 1951 |

FOREIGN PATENTS

| | | |
|---|---|---|
| 455,574 | Canada | Mar. 29, 1949 |